United States Patent

Burstein

[15] 3,648,825
[45] Mar. 14, 1972

[54] CONVEYOR BELT TENSIONING DEVICE FOR TUNNEL COOKER
[72] Inventor: Norman Burstein, Cherry Hill, N.J.
[73] Assignee: Conveyor Heat Products Corp.
[22] Filed: June 10, 1969
[21] Appl. No.: 831,866

[52] U.S. Cl. ............................................198/195, 198/208
[51] Int. Cl. .........................................................B65g 15/30
[58] Field of Search .........................198/135, 208, 195, 199;
74/242, 12, 16; 162/273, 199

[56] References Cited

UNITED STATES PATENTS

| 14,927 | 5/1956 | Price | 198/195 |
| 3,448,678 | 6/1969 | Burstein | 198/195 |

Primary Examiner—Richard E. Aegerter
Attorney—Morton C. Jacobs

[57] ABSTRACT

A conveyor cooker has a housing with a tunnel enclosure portion through which passes an open-work conveyor that is formed of linked bars, with one bar having a removable open link. The conveyor loop is completed by connecting the open link to the last link, and by applying tension to the conveyor loop to maintain the connection of the open link bar. A tension applying means includes a roller and shaft that engage inside of the belt and are mounted in brackets extending externally of the housing. The brackets include an inclined camming surface along which the shaft slides to apply the tension, and grooves in which the shaft seats to maintain the tension.

9 Claims, 2 Drawing Figures

PATENTED MAR 14 1972  3,648,825

INVENTOR.
NORMAN BURSTEIN
BY
Morton C. Jacobs
ATTORNEY

CONVEYOR BELT TENSIONING DEVICE FOR TUNNEL COOKER

BACKGROUND OF THE INVENTION

This invention relates to cooking equipment, and particularly to a conveyor cooker employing an openwork conveyor belt, and the attachment and tensioning means therefor. In a conveyor cooker the conveyor belt must frequently be removed for cleaning off food debris, and it is thereafter reinserted in the cooker and mounted with appropriate belt tension. One form of such a conveyor cooker to which this invention is applicable is that described in applicant's copending, allowed application Ser. No. 658,741, now U.S. Pat. No. 3,448,678, issued June 10, 1969. In that cooker, a tunnel enclosure is provided through which the conveyor belt passes to move the food between radiant heating elements, and the cooking is performed during the passage through the tunnel enclosure.

The conveyor belt of that cooker includes a plurality of spaced bars that extend across the path of the belt with their ends bent to form a closed link around the next adjacent bar. One of the bars of the belt is formed with open links for removably engaging the next adjacent bar to complete the continuous belt. At the unloading end of the housing a belt support and housing include means for releasably applying tension to the belt to maintain the open-link bar in engagement, whereby the tension may be released, the bar unhooked and the belt removed for cleaning.

SUMMARY OF THE INVENTION

It is among the objects of this invention to provide a new and improved conveyor belt and tensioning means for use in a conveyor cooker.

Another object is to provide a new and improved conveyor belt and tensioning means whereby an openwork conveyor belt may be quickly and reliably secured to and removed from a cooker housing.

In one embodiment illustrative of this invention, the conveyor belt is constructed in the manner described above and in the aforementioned copending application, the description of which is incorporated herein by reference. The belt tensioning means includes a roller rotatably mounted on a shaft and inserted within the completed loop of the conveyor belt. The shaft, in turn, is mounted onto brackets that extend from the unloading end of the cooker housing. The brackets include inclined camming surfaces extending outwardly from the said housing in the unloading direction, and seating grooves at the end of the inclined camming surface. The roller and shaft are inserted inside of the conveyor belt for applying tension to the belt, and the shaft is moved along the bracket camming surfaces to apply tension within the belt and, at the extreme ends of the camming surfaces, the shaft seats and is retained in the bracket grooves, whereby the full tension is applied to the belt and maintained by the seated shaft. The brackets also include thumb rest portions for assisting in the removal of the shaft from the seating grooves, whereby the tension in the belt may be readily relieved and the belt unhooked and removed for cleaning.

BRIEF DESCRIPTION OF THE DRAWING

The foregoing and other objects of this invention, the various features thereof, as well as the invention itself, may be more fully understood from the following description when read together with the accompanying drawing, in which.

Throughout the drawing, similar parts are referenced by corresponding numerals.

DESCRIPTION OF A PREFERRED EMBODIMENT

Figure 2:
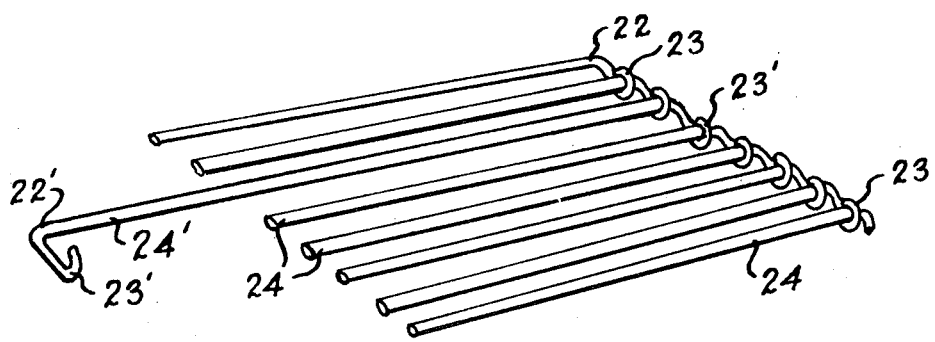
FIG. 2 is a perspective view of a fragment of the conveyor belt used in the cooker of FIG. 1.
Figure 1:
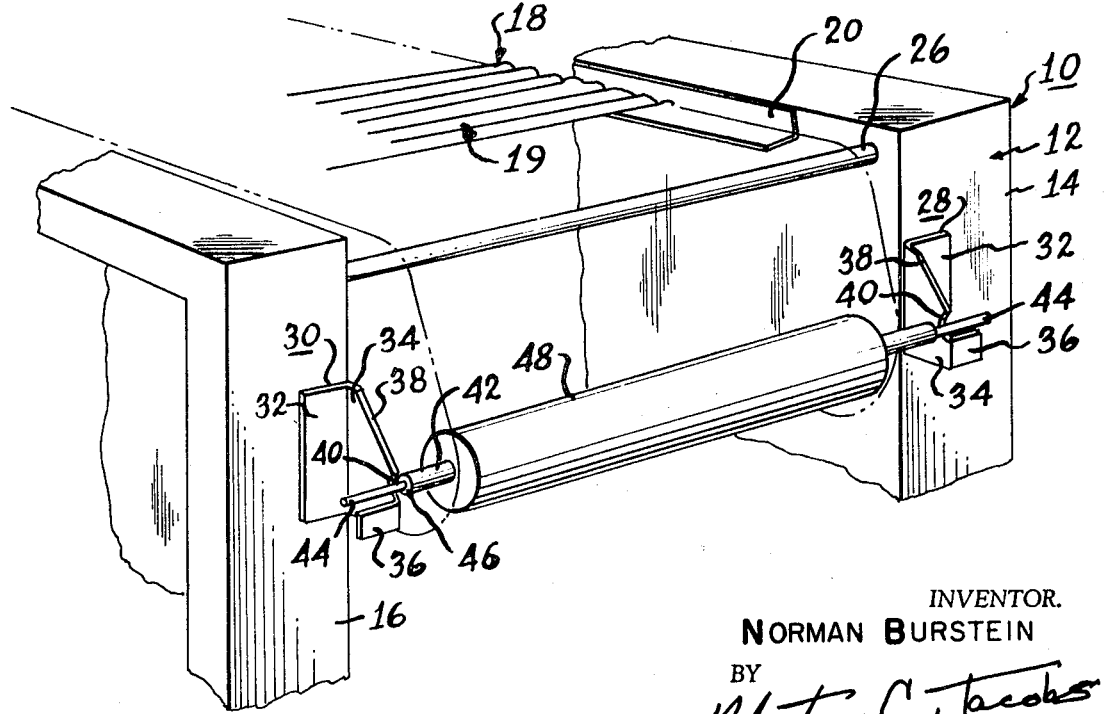
FIg. 1 is a perspective view of a portion of the top, unloading end of a conveyor cooker and conveyor belt tensioning device embodying this invention.

The conveyor cooker illustrated in the drawing includes a housing 10 having an unloading end 12. A pair of side housing walls 14 and 16 form a tunnel enclosure for a conveyor belt 18 and heating elements (not shown). The heating elements may be provided above or below the conveyor, or both above and below, and a lid for enclosing the heating elements and thereby forming a tunnel enclosure is also provided, all as is described in the aforementioned copending application which is incorporated herein by reference. Food is loaded on the upper belt surface 19, and the belt 18 carries the food through the heating enclosure to the unloading end 12, where the belt 18 passes outside of the housing 10 and carries the food outside for unloading.

The conveyor belt 18 is formed of a plurality of steel bars 24, coated with teflon or other suitable material which is adapted to be subjected to high temperatures in the cooking unit and may be readily cleaned. Each of the bars 24 extends at right angles to the path of the belt through the housing 10 and has its ends 22 bent to extend along that path. Each end 22 terminates in a closed line 23 which embraces the next adjacent bar 24. In this fashion a continuous openwork, flexible conveyor belt, in the nature of a grille, is formed. One of the bars 24' (shown full length in the drawing for easy identification) has an open link 23' at each end 22'. This open link 23' permits ready engagement and disengagement of the belt within the conveyor, whereby the user may remove the belt for cleaning and thereafter reinsert and assemble it within the housing.

An angle bracket 20 on the inside of the housing wall 14, and a similar bracket on the inside of wall 16, project inwardly to provide shoulder supports for the linking ends 23 and 23' of the conveyor bars 24 and 24'. Thus the curved portions of the links 23 of the conveyor bars bear on the brackets as the conveyor belt arrives through the tunnel enclosure, and thereby maintain the conveyor belt 18 substantially in a horizontal orientation from the drive sprockets (not shown) at the loading end of the housing, to a rod 26 providing a belt support and bearing at the unloading end. A fixed rod 26, preferably of stainless steel, has been found suitable for a sliding bearing; however, a rotatable idler bearing may be used in place thereof.

A pair of brackets 28 and 30 project outwardly from the unloading ends of the side housing walls 14 and 16 respectively. These brackets may each be formed of bent sheet metal such as stainless steel. Each bracket is formed with a flat base portion 32 which is fixedly attached to its housing wall and an ear 34 projecting from the base in the unloading direction. A lug 36 at the free end of the ear 34 is bent back therefrom. The ear 34 includes an inclined camming surface 38 extending from a point near the base 32 and inclined downwardly and outwardly therefrom and terminating in an arcuate seating groove 40.

A shaft 42 has reduced portions 44 at each end thereof forming shoulders 46 which are located at spaced points that correspond to the space between the ears 34 of the brackets 28 and 30, whereby the shaft is firmly seated between those brackets. The reduced portions 44 fit within the seating grooves 40 to retain the shaft in its tensioned position. A roller 48, preferably formed of an easily cleanable material such as Teflon, is rotatably mounted on the shaft and has a length approximately equal to the width of the conveyor belt, whereby the belt rides on the roller and is tensioned thereby.

The conveyor belt is mounted within the housing by passing it through the enclosure portion and having it rest on the brackets 20. With the roller 48 out of the way, the loop of the belt is readily completed by connecting the open link ends 22' of the bar 24' to the last bar 24 of the belt. Thereafter, the roller mounted on the shaft is inserted inside of the belt at the unloading end. The shaft portions 44 are placed on the camming surfaces 38 of the brackets 28 and 30 at the tops thereof, and by pressure applied to the portions 44 the roller is moved down and easily rotated along the camming surfaces to their ends where the shaft portions 44 move into and are seated in the grooves 40. The shaft shoulders 46 retain the shaft between the bracket ears 34 so that the shaft is securely retained in position. In that condition the conveyor loop is fully and properly tensioned by the roller 48, and the latter also provides a suitable bearing for the conveyor belt as it passes out of the tunnel enclosure of the cooker with the food. In this fashion, a relatively large tension can be manually applied to the belt without difficulty by an operator.

For removal of the conveyor belt, outward pressure is applied to the shaft portions 44 to unseat them from the grooves 40. For this purpose the lugs 36 act as thumb rests whereby the outward pressure may be easily applied to the shaft. The shaft portions 44, when unseated, readily roll up the camming surfaces 38 to relieve the tension on the belt, and the roller 48 can be removed from within the belt. The open link 23' of the conveyor belt 24' is then readily unhooked from the last bar 24 of the belt 18, and the belt then removed from the tunnel enclosure for cleaning.

Thus, in accordance with the foregoing description, a new and improved conveyor cooker mechanism is provided by this invention. A tensioning device and an openwork conveyor belt makes it possible to readily remove the belt for cleaning and for reassembly on the cooker and for applying the desired tension to the loop of the completed conveyor belt. It will be apparent that the above described embodiment is exemplary of the various features of this invention and that modifications can be made within the scope of the invention as defined in the appended claims.

What is claimed is:

1. In a conveyor cooker comprising:

a housing including an enclosure portion, and an unloading end;

an open-work continuous conveyor belt extending as a material supporting surface in said housing through said enclosure portion to said unloading end, said conveyor belt including a plurality of spaced bars extending transversely of the path of said belt with the ends thereof bent to extend substantially along said path, each end of a plurality of said bars being formed with a substantially closed link around the next adjacent bar, and one of said bars being formed with open links for removably engaging the next adjacent bar to complete the continuous belt;

and means connected to said housing for providing a bearing for the moving belt, and for releasably applying tension to said belt to extend the belt and to maintain said open-link bar in engagement, including rod means and a pair of spaced brackets mounted on said housing for removably supporting said rod means to engage the inside surface of said belt and to apply tension thereto, whereby upon removal of said rod means, the open-link bar of said belt is disengageable for removal of said belt, the improvement therein of:

said brackets of said bearing and tension applying means, each including an inclined camming surface and a seating surface for said rod means at one end of said camming surface;

whereby tension is applied to said belt by moving said rod means along said bracket camming surfaces to said seating surfaces of said brackets for retention therein.

2. An improved conveyor belt and tension applying means for use in a conveyor cooker as recited in claim 1, wherein said brackets each include a base attached to said housing, an ear projecting from said base and having said camming and seating surfaces formed along an edge thereof, and a lug projecting from said ear forming a thumb rest for assistance in applying manual pressure to said rod means during unseating thereof.

3. An improved conveyor belt and tension applying means for use in a conveyor cooker as recited in claim 2, wherein said rod means includes a shaft and roller mounted thereon, said shaft having ends dimensioned for seating in said seating surfaces and shoulders for retention between the ears of said brackets.

4. An improved conveyor belt and tension applying means for use in a conveyor cooker as recited in claim 1, wherein said tension applying means extends the belt in a direction outwardly from said enclosure portion and parallel to said material supporting surface, and said brackets are spacedly mounted on said housing for said belt to pass therebetween, and wherein said camming surface is formed at an oblique angle to said material supporting surface.

5. An improved conveyor belt and tension applying means for use in a conveyor cooker as recited in claim 4, wherein said brackets each include a base attached to said housing, an ear projecting from said base in said tension direction and having said camming and seating surfaces formed along an edge thereof, and a lug projecting from said ear forming a thumb rest for assistance in applying manual pressure to said rod means during unseating thereof; said lug being located on one side of said seating surface remote from said camming surface.

6. An improved conveyor belt and tension applying means for use in a conveyor cooker as recited in claim 5, wherein said rod means includes a shaft and roller mounted thereon, said shaft having ends dimensioned for seating in said seating surfaces and shoulders for retention between the ears of said brackets.

7. An improved conveyor belt and tension applying means for use in a conveyor cooker as recited in claim 5, wherein said seating surface of each of said brackets is open and faces in said tension direction so that said rod means is substantially unenclosed when seated and can be moved in said tension direction without external interference.

8. An improved conveyor belt and tension applying means for use in a conveyor cooker as recited in claim 7, wherein said ear is planar and said thumb rest lug extends transversely to the plane thereof and away from the belt therebetween.

9. An improved conveyor belt and tension applying means for use in a conveyor cooker as recited in claim 8, wherein said camming surface is inclined downwardly and outwardly from said material supporting surface and said base respectively.

* * * * *